(12) United States Patent
Mauersberger

(10) Patent No.: US 10,953,496 B2
(45) Date of Patent: Mar. 23, 2021

(54) METHOD FOR INTRODUCING A DEFINED TEAR LINE BY MEANS OF A PULSED LASER BEAM VIA MATERIAL REMOVAL ON A COVER MATERIAL

(71) Applicant: EISSMANN AUTOMOTIVE DEUTSCHLAND GMBH, Bad Urach (DE)

(72) Inventor: Stefan Mauersberger, Großruckerswalde (DE)

( * ) Notice: Subject to any disclaimer, the term of this patent is extended or adjusted under 35 U.S.C. 154(b) by 157 days.

(21) Appl. No.: 16/085,684

(22) PCT Filed: Feb. 23, 2017

(86) PCT No.: PCT/EP2017/054172
§ 371 (c)(1),
(2) Date: Sep. 17, 2018

(87) PCT Pub. No.: WO2017/162397
PCT Pub. Date: Sep. 28, 2017

(65) Prior Publication Data
US 2019/0111522 A1  Apr. 18, 2019

(30) Foreign Application Priority Data
Mar. 24, 2016 (DE) ...................... 10 2016 105 567.0

(51) Int. Cl.
*B23K 26/40* (2014.01)
*B23K 26/03* (2006.01)
(Continued)

(52) U.S. Cl.
CPC .......... *B23K 26/402* (2013.01); *B23K 26/009* (2013.01); *B23K 26/03* (2013.01);
(Continued)

(58) Field of Classification Search
CPC .... B23K 26/402; B23K 26/009; B23K 26/70; B23K 26/03; B23K 26/032; B23K 26/382;
(Continued)

(56) References Cited
U.S. PATENT DOCUMENTS

| 6,407,362 B1* | 6/2002 | Schmid | B23K 26/06 219/121.7 |
| 7,497,463 B2* | 3/2009 | Kaulbersch | B26F 1/24 280/728.3 |

(Continued)

FOREIGN PATENT DOCUMENTS

| DE | 19636429 | 11/1997 |
| DE | 202009004927 | 10/2010 |

(Continued)

*Primary Examiner* — Geoffrey S Evans
(74) *Attorney, Agent, or Firm* — Mark Wisnosky

(57) ABSTRACT

The invention relates to a method for introducing a defined tear line via material removal on a cover material (20), which has a visible side (22) and a rear side (21) opposite the visible side (22), wherein a pulsed laser beam (31) from a laser (30) is directed to the rear side (21) of the cover material (20) and is guided along a path (50) and at least one observation unit (11) is provided for monitoring the weakening process, wherein a hollow chamber (32) is provided on the visible side (22) of the cover material (20) which has a scattering and/or reflecting inside surface (33) and at least one observation unit (11) is provided on the hollow chamber (32), wherein the light (40) emerging on the visible side (22) of the cover material (20) during the laser irradiation is incident on the inside surface (33) of the hollow chamber (32) and is scattered and/or reflected at least in part on the at least one observation unit (11) and the light incident on the at least one observation unit (11) is used to control the laser (30). A luminescent inside surface (33) can also be used as a hollow chamber (32).

12 Claims, 3 Drawing Sheets

Figure 1:
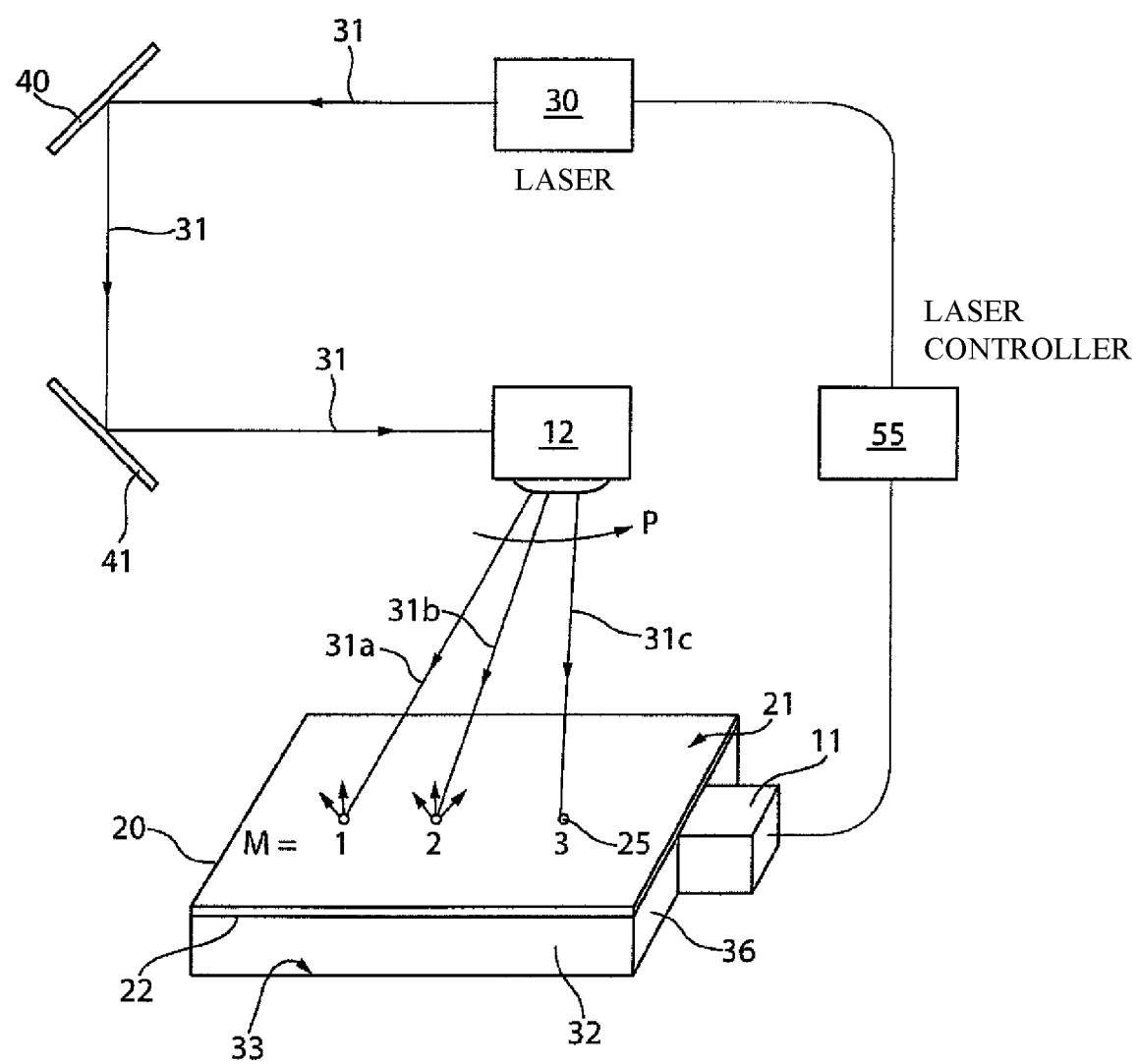

(51) Int. Cl.
- *B23K 26/082* (2014.01)
- *B23K 26/402* (2014.01)
- *B23K 26/00* (2014.01)
- *B23K 26/70* (2014.01)
- *B23K 26/359* (2014.01)
- *B23K 26/382* (2014.01)
- *B23K 26/0622* (2014.01)

(52) U.S. Cl.
CPC ........ *B23K 26/032* (2013.01); *B23K 26/0622* (2015.10); *B23K 26/082* (2015.10); *B23K 26/359* (2015.10); *B23K 26/382* (2015.10); *B23K 26/70* (2015.10)

(58) Field of Classification Search
CPC ... B23K 26/384; B23K 26/359; B32K 26/359
See application file for complete search history.

(56) References Cited

U.S. PATENT DOCUMENTS

| | | |
|---|---|---|
| 2001/0006168 A1 | 7/2001 | Okumura et al. |
| 2012/0104237 A1 | 5/2012 | Rossbach |
| 2016/0067821 A1* | 3/2016 | Lutze .................. B23K 26/364 |
| | | 219/121.69 |

FOREIGN PATENT DOCUMENTS

| | | |
|---|---|---|
| DE | 102005040017 | 3/2014 |
| DE | 102013104138 | 3/2014 |
| EP | 1750978 | 2/2007 |
| EP | 2093011 | 8/2009 |
| EP | 2962800 | 1/2016 |
| WO | WO2005049261 | 6/2006 |
| WO | WO-2009103815 A1 * | 8/2009 ........ A61M 25/0015 |

* cited by examiner

METHOD FOR INTRODUCING A DEFINED TEAR LINE BY MEANS OF A PULSED LASER BEAM VIA MATERIAL REMOVAL ON A COVER MATERIAL

The present invention relates to a method for introducing a defined line of weakness by means of a pulsed laser beam by material removal of a covering material. Covering materials having weaknesses which have been introduced are employed in the automotive sector, for example for manufacturing coverings for airbags.

Nowadays, airbags are integrated in motor vehicles in various places, for example in steering wheels, dashboards, doors, seats, headliners etc. For a reliable functionality of the airbag, it is necessary that the plastic carrier has one or more material weaknesses, so-called predetermined breaking points, in all of its layers, said material weaknesses defining the firing channel of the airbag.

For optical reasons or because of the design, the motor vehicle manufacturers require that, for example, the passenger airbag which is integrated into the dashboard is designed to be invisible on the side facing the occupant. For this purpose, the dashboard having the airbag flap integrated therein is provided with a covering material which has a line of weakness in the region of the boundary of the airbag flap, such that the secure opening of the airbag flap and the unfolding of the airbag remain guaranteed in the event of a collision.

The opening of the covering material along the line of weakness must additionally take place within a predetermined time window. Likewise, uncontrolled particle flight by flying debris must be avoided in any event.

Such covering materials for airbags made from various materials are known, for example made from plastic films, upholstery material, textiles, slush, artificial leather or fibrous materials such as natural leather. Especially with upscale vehicle equipment, the coverings are frequently manufactured from natural leather. The leather employed in the automotive sector is made of an epidermis and a dermis. Due to the variations in the thickness of the leather and the relatively low thickness of the epidermis, a cutting depth is frequently chosen at which the epidermis remains unbroken when generating weaknesses in the leather by cutting the leather with a knife or a blade. However, the natural variation range of the unbroken leather leads to a wide variation range of the tear resistance.

Especially with predetermined breaking lines for airbag covers, the requirements for a reproducible and low tear resistance which cannot always be fulfilled by mechanical cutting are especially high.

Introducing linear perforations of a length of less than 0.8 mm into the leather which are spaced apart from one another has already been suggested, as described in EP 1 750 978 B1. A leather which has been weakened in this manner has substantially invisible weaknesses with good tearing properties, due to the minimum size of the perforations introduced which are the size of the leather pores, wherein the weakness are introduced, in particular, with a blade.

The practice of perforating lines of weakness, in particular also in airbag covering materials or in decorative layers for airbag covers by means of lasers is additionally known. Microholes are introduced into the material for targeted weakening of leather by means of UV laser radiation. These are generally arranged along a track and thus form a defined line of weakness. The irradiation takes place on the rear side, the so-called flesh side of the leather, such that the front side or upper side of the leather is only minimally damaged by the laser radiation.

The microholes are generally generated by irradiation multiple times with individual laser pulses. Because leather is a very inhomogeneous material, the number of laser pulses which are necessary for complete piercing of the leather varies significantly, the deviations are approximately ±50% of the average value.

However, for a defined and secure perforation, the complete or virtually complete piercing of the leather is essential.

If, however, the leather is further irradiated at the place of a microhole even though a complete piercing has already taken place, an undesired local discolouration and hardening of the leather ensues very quickly.

In order to avoid changes in the fibrous structure of the leather which lead to elevation and thus to visibility of the line of weakness, either sub-cooling the leather before the laser machining or pre-shrinking it or treating it with a special fixative on the rear side, as described in WO 2005/049261, has been suggested, for example.

DE 196 36 429 C1 describes a method for generating a line of weakness in a covering material by local removal of the covering material on one side in the form of blind holes by means of controllable pulsed laser radiation, wherein a relative movement between the laser radiation and the covering material takes place in the direction of the line of weakness to be generated, and the laser radiation transmitted through the base of the respective blind hole is detected after each laser pulse by means of a sensor, the integral value is formed and compared to a desired value and the laser radiation is switched off when a desired value is reached and switched on again after a relative movement at the nearest blind hole which is still to be weakened has taken place.

Such a determination of the residual wall strength by means of a transmission measurement makes it necessary, however, that the sensor or the photodiode follows the position of the laser beam. In order to be able to measure the laser pulse at each impact point and switch off the laser if necessary, the photodiode is moved with it, corresponding to the movement of the laser beam on the visible side of the covering material. However, this method cannot be implemented with use of high-repetition lasers, because the photodiodes cannot be moved at the required speed with the required accuracy.

A method for introducing a defined line of weakness is known from EP 2 962 800 A2, in which a pulsed laser beam from a laser is directed at the rear side of a covering material and guided along a track. An observation unit is arranged below the visible side of the covering material.

EP 2 093 011 A1 teaches a method for introducing a bore into a wall of a workpiece, in which a laser beam penetrating the wall strikes an optical fibre which absorbs the laser beam.

A radiation detection system having a sensor unit is known from US 2012/0104237 A1, wherein the sensor unit has a hollow chamber having a scattering inner surface, and an observation unit is provided on the hollow chamber which scatters laser radiation striking the inner surface of the hollow chamber at least partially towards the observation unit.

DE 10 2013 104 138 B3 teaches a method in which optical and haptic changes in the leather which has been weakened by means of a laser beam are intended to be prevented by the laser beam being guided linearly on the rear side of the leather and the linear guiding being a multiple repetition of a scanning movement in which only one laser pulse is discharged per impact point. Here, the parameters of the laser pulse are chosen such that it causes an energy input which leads to heating of the covering material at the respective impact point to a temperature above an ablation threshold, but the temperature is below a limit temperature in regions adjacent to the respective points of incidents.

The checking of the residual wall strength likewise takes place with a photodiode which is arranged opposite the short pulse laser in the direction of the laser bream on the visible side of the fibrous covering material. The photodiode continually measures the strength of a portion of the laser pulse, said portion being transmitted through the fibrous covering material, such that the laser beam can be switched off upon reaching the desired minimal residual wall strength before a complete passage through the fibrous covering material. If the minimum residual wall strength is already reached at an impact point, a local switching-off of the laser beam takes place at this impact point during the next scanning movement.

So that the scanning movement is no longer necessary, a plurality of photodiodes arranged in series is provided along the scanning track. In this method, the sensor must be spatially high-resolution (at least in the region of the hole spacing of the perforation line) and it must have the size of the perforation portion to be machined. If the geometry of the perforation line changes, a new sensor array must thus be integrated into the machining unit. This makes the method inflexible.

However, since blind regions at which no measurement of the laser pulse can take place still remain after the photodiodes are arranged in series, this method also does not enable the desired secure checking.

The object of the present invention is to improve the method for introducing lines of weakness by means of a pulsed laser beam by material removal of a covering material, in particular leather, in such a way that it can also be carried out using high-repetition laser sources and highly dynamic laser scanning devices, and sufficiently weakened covering materials having substantially invisible lines of weakness can be obtained.

This object is solved by the features of claims 1 and 2.

According to the invention, a hollow chamber having an at least partially reflective or scattering inner surface is provided below the visible side of the covering material such as leather, an observation unit being arranged on said hollow chamber, such that the laser beam emerging from the microhole during the laser radiation on the visible side of the covering material and striking the inner surface of the hollow chamber is reflected at least partially onto the observation unit and/or scattered, and the radiation of the laser according to claim 1, said radiation being incident on the observation unit, is used for controlling the laser.

If, according to claim 2, an inner surface is used which is not only scattering or reflective but also luminescent, luminescent light is generated when the laser beam strikes the inner surface, and the luminescent light is then measured in the observation unit.

As soon as the microhole is pierced in the covering material, laser radiation reaches the hollow chamber located below the visible side of the covering material, said hollow chamber according to claim 1 having a scattering and/or reflective surface. The laser beam striking the inner surface of the hollow chamber is scattered and reflected there, wherein a part of the radiation then reaches the observation unit which measures the intensity of the laser light striking it.

The hollow chamber can be used independently of the respective geometry of the perforation lines, provided that the size of the hollow chamber is selected on the basis of a perforation line of maximum size.

When a specific threshold value of the intensity of the radiation detected is exceeded, this indicates that the hole has been pierced or the residual wall has been sufficiently weakened such that a local switching-off of the laser takes place at this impact point during the next scanning movement.

The method according to the invention can also be used with highly dynamic laser processes, because the hollow chamber is stationary and must not, as is known from the prior art of known sensors, be moved in a manner corresponding to the movement of the laser beam. In order to be able to monitor the piercing of the holes throughout the entire holes arranged along a track, the hollow chamber should extend on the visible side of the leather at least along the entire track which is to be machined with the laser.

The hollow chamber is preferably substantially rectangular, wherein the covering material, in particular leather, rests with its visible side on the outer surface of the hollow chamber, said outer surface facing upwards. There is a slot in the side of the chamber facing upwards. The movement of the laser takes place along the slot, such that the laser light can enter the interior of the hollow chamber after piercing of a microhole through the leather.

Because the laser beam is maximally focused on the impact point on the leather, the laser beam expands again on the visible side of the leather after the piercing of the leather, such that a surface is irradiated by the laser beam on the interior of the hollow chamber, said surface being larger than the diameter of the microhole, which contributes to an averaging of the measured light intensity and reduction in artefacts.

The size of the inner surface which is irradiated with the laser light can be controlled by the distance between the microhole and the first point of incident of the laser beam on the inner surface of the hollow chamber. The larger the irradiated surface is, the more diffuse the radiation striking the observation element is.

In general, the distance c between the microhole in the covering material and the first impact point of the laser beam on the inner surface of the hollow chamber is between 1 cm and 20 cm, preferably between 5 cm and 10 cm. Based on a 20 cm long and 20 cm wide airbag cover, it is recommended to provide a box-shaped hollow chamber that is approx. 40 cm long (length 1), 30 cm wide (width b) and 5 cm to 10 cm deep (depth c) in the upward-facing side of which an approx. 10 mm wide slot is provided which corresponds in terms of its course to the course of the line of weakness.

The inner surface of the hollow chamber should have a high reflectivity and absorb as little as possible, in order to still scatter/reflect sufficient light onto the photodiode with any microhole, even microholes which are maximally remote from the photodiode.

This preferred variant is characterised by a high signal strength.

In a further, especially preferred variant according to claim 2, the inner surface of the hollow chamber not only scatters and reflects, but is additionally luminescent, such that the laser radiation is converted into a lower-energy wavelength and the intensity of the luminescence radiation is detected in the observation unit. The sensitivity of conventional Si photodiodes is significantly higher in the VIS range (luminescence) than in the UV range. Furthermore, the emission of the luminescent radiation takes place in an undirected (diffuse) manner.

By means of the uniform radiation characteristic of the luminescence radiation or fluorescence radiation, a portion of the radiation always reaches the photodiode/s directly or via multiple reflections on the chamber walls, said photodiode/s being attached laterally to the hollow chamber. The detection of the fluorescence radiation by the observation unit, in particular photodiodes, is used as a trigger for the process termination. The assignment of the measurement signal to the perforation site is achieved via the synchronisation of laser beam source, scanning device, observation unit and the laser pulse control or laser pulse switching-off device, such that the site at which the laser radiation strikes the inner surface of the hollow chamber is irrelevant.

As long as the inner surface of the hollow chamber is luminescent, the inner surface should have the highest possible reflectivity or scattering power for the luminescent radiation itself.

Paper can be used as a cost-efficient inner surface coating that has a high reflectivity and is fluorescent.

In order to achieve an especially high reflection and a low absorption, the use of a barium sulphate coating of the inner surface or the use of optical PTFE is preferred. These coatings are not fluorescent and thus can only be employed in the variant in which the scattered laser light is detected.

A combination of a luminescent inner surface in the chamber (on the base), absorbed in the UV radiation and converted into luminescent radiation and a reflective or scattering inner surface on the wall of the chamber is likewise possible.

An advantage of the method according to the invention is that the method can also be reliably implemented with bright or luminescent covering materials, in particular leathers, because any competing luminescent light generated by the laser beam striking the bright leather is radiated virtually completely in the direction of the rear side of the leather and thus does not reach through the microhole to the inner side of the hollow chamber or reaches it only in a vanishingly low portion.

In a preferred variant, the pulsed laser beam from the laser falls firstly on the rear side of the covering material via a mirror and a scanning device, wherein the laser pulse is guided along the track by the scanning device. The scanning device serves for moving the laser beam on the rear side of the leather along the desired track.

In general, scanning devices comprise a scanning head having drive electronics and control electronics. The laser beam is deflected in the scanning head, its deflection angle is measured and (mostly) electronically regulated. In general, the deflection speed, the working distance to the covering material, the machining geometry and the number of crossings (repetitions of the machining cycle) can be changed in the scanning device to be used. The simplest method of generating a scanning movement is the change in the orientation of a mirror.

The observation unit serves for monitoring the laser process, i.e. the drilling of the holes. The observation unit can be, for example, a camera system or photodiode system. It is likewise possible to provide several photodiodes or other observation units on the hollow chamber. The observation unit is preferably arranged laterally, wherein it is irrelevant on which side. The size of the observation unit can be, for example, 50 mm×35 mm×15 mm. The observation unit is preferably a silicon photodiode having a sensitivity between 200 nm and 1100 nm. The light-sensitive surface can comprise, for example, 13 mm$^2$ and a sensitivity of 0.3 A/W.

The photodiode(s) are stationary and are preferably located laterally on the hollow chamber and they detect scattered laser radiation or fluorescent radiation independently of the impact point of the laser beam in the chamber.

As soon as it is detected in the observation unit that a threshold value of the light measured in the observation unit is exceeded, a switching-off of the laser is caused at this site. This takes place with a pulse switching-off device. The pulse switching-off device should be very fast, i.e. be able to monitor at least 50,000 holes per second, process very short pulses having half-widths of approx. 35 nanoseconds and also be suitable for processing signals having a very low level of 10 mV to 20 mV.

The switching threshold can be defined by means of an adjustable reference level.

Additionally, the pulse switching-off device should be able to store at least 10,000 values (corresponding to 0.6 m with a hole spacing of 60 micrometres).

As a result of the option of storing the sensor data, there is also an excellent possibility of quality assurance of the leather perforation and evidence of the successful machining.

When a specific threshold value is exceeded, this can be used as a trigger for the process termination, i.e. no more laser machining is carried out at this point in the leather.

In the context of the method according to the invention, a pulsed UV laser is preferably employed, wherein a solid-state laser having a wavelength of 355 nm or an excimer laser having a wavelength of 351 nm, 308 nm or 248 nm is especially preferred. The pulse times should preferably be under 200 ns. The beam diameter is 5 to 50 micrometres and is preferably approx. 20 micrometres.

Leather, artificial leather or flat goods can preferably be used as covering material. In general, the diameter of a hole introduced into the covering material by the laser is preferably 5 to 50 micrometres and particularly preferably 10 to 20 micrometres with a hole spacing of 25 to 100 micrometres, preferably 35 to 60 micrometres. The holes are located on a line which can run straight but can also run in a wavy or zig-zag shaped manner or differently.

The airbag upholstery manufactured in the method according to the invention is characterised in that the perforated sites are not visible and cannot be felt and the airbag covering, which is preferably made of leather, nevertheless tears with a defined force. Additionally, there is a reliable reproducibility.

Figure 2:
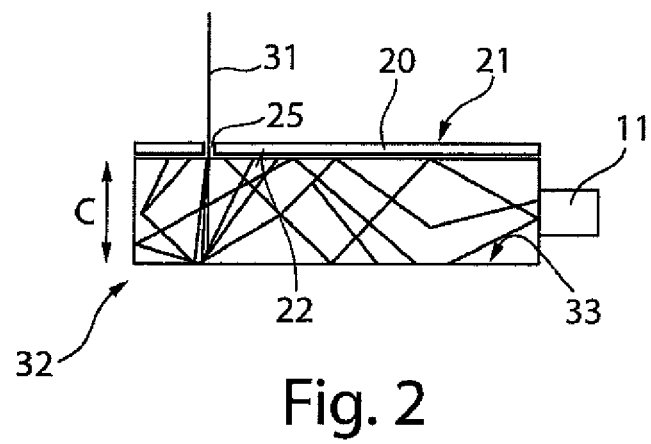
Figure 3:
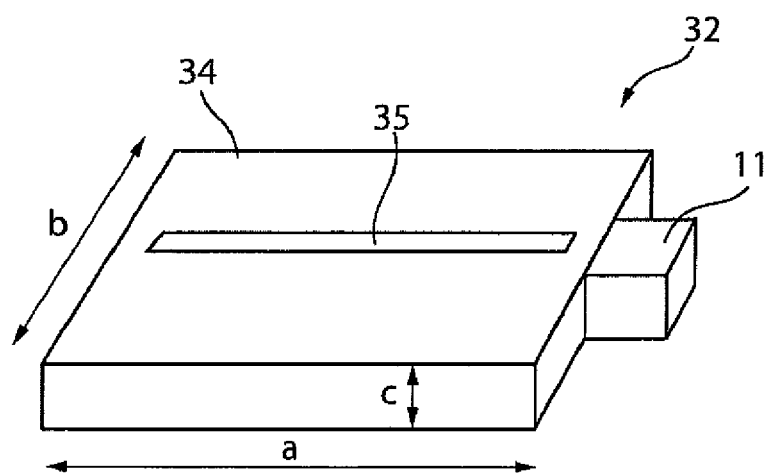
Figure 4:
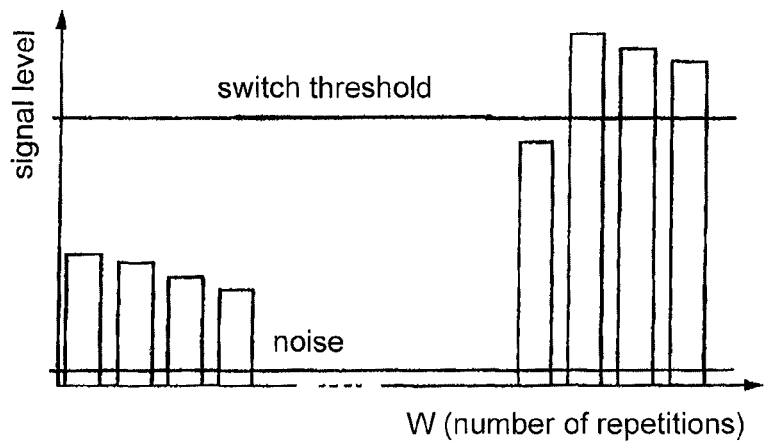
Figure 5:
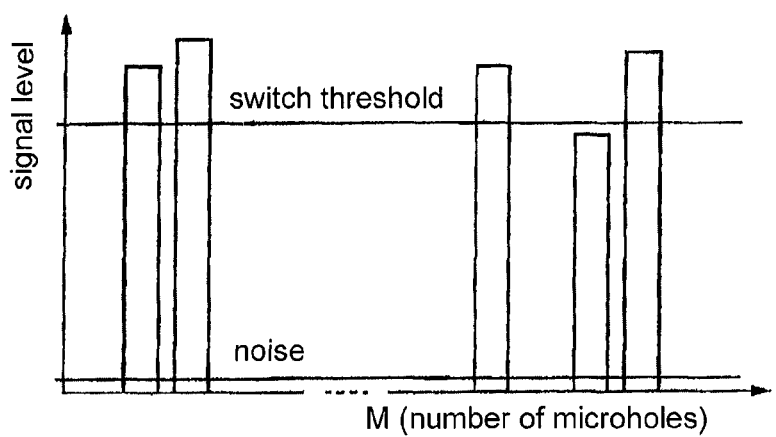

The invention and further advantageous embodiments and developments of the same are described in more detail and explained in more detail below using the examples depicted in the drawings. The features that can be seen in the description and the drawings can be applied individually or in several different combinations according to the invention. Here are shown:

FIG. 1 a schematic depiction of the method according to the invention and of the structure, FIG. 2 the schematic radiation course in the hollow chamber, FIG. 3 a schematic perspective depiction of the hollow chamber, FIG. 4 a schematic depiction of the signal level in the observation unit, depending on the number of repetitions and FIG. 5 a schematic depiction of the signal level of the observation unit, depending on the microholes.

In FIG. 1, a laser 30, a laser controller or pulse switching-off device 55 as already described above, an observation unit 11, a scanning device 12 and a leather piece 20 are schematically depicted. The rear side 21 of the leather piece 20 faces upwards in FIG. 1. Below the visible side 22 of the leather piece 20, there is a hollow chamber 32, the inner surface 33 of which is coated with a reflective material. A photodiode is provided as an observation unit 11 in a side wall 36 of the hollow chamber 32.

The focused pulsed laser beam 31 emerging from the laser 30, the beam path of which is also denoted by 31, is reflected on a first mirror 40 and a second mirror 41 and reaches the scanning device 12 which serves for moving the laser beam 31 along a specific track 50 across the leather piece 20, as symbolically depicted by the arrow P in FIG. 1. Because the laser radiation is pulsed and the laser beam 31 is moved along the track 50 over the leather piece 20, the laser beam 31 is firstly moved to the site M=1 corresponding to the beam 31a, then to the site M=2 corresponding to the beam 31b and so on. During the processing, a point by point removal occurs at each site M. If the movement sequence is now carried out with a large number of repetitions W, at each site M of the pointwise removal, a complete piercing of the leather 20, namely a hole 25, thus occurs gradually.

Various sites M=1, 2, . . . are marked on the leather in the region of the leather 20 in FIG. 1.

The passage of the light through the hole 25 takes place as soon as the hole 25 has been completely pierced, see: site M=3. The laser pulse now reaches the hollow chamber 32 and falls on its inner surface 33, is reflected there and reaches the observation unit, namely the photodiode 11, as schematically depicted in FIG. 2, in a series of reflections in the hollow chamber 32.

In FIG. 2, it can also be seen that the pulsed laser beam 31 striking the reflective inner surface 33 is somewhat expanded and the laser light reaches the photodiode 11 to a certain extent by means of a plurality of reflections and scatterings.

The depiction in FIG. 2 also applies correspondingly when the inner surface 33 is luminescent. In this case, the pulsed laser beam 31 falls onto the inner surface 33 and is partially converted into luminescent light which is then scattered/reflected partially onto the photodiode.

However, the laser light is partially scattered and reaches another site of the inner surface 33 having a luminophore and is then converted into luminescent light etc., such that, as a result, a portion of the primary or scattered laser light 31 is converted into longer wavelength luminescent light by scattering and absorption, which is then detected in the photodiode.

FIG. 3 schematically shows the construction of the hollow chamber 32 which is box-shaped and closed except for a slot 35 in the upward-facing side 34. The leather 20 is to be draped on the slot 35 in such a way that the track 50 to be traversed runs above the slot 35, such that the laser light can fall into the hollow chamber 32 after piercing of a microhole 25.

In FIG. 4, the signal level of the radiation detected by the observation unit 11 is schematically depicted depending on the number of repetitions W. Since the leather 20 initially still has no hole 25 and the radiation 31 of the laser 30 also cannot pass through the leather, only a noise is initially detected. After a plurality of repetitions W, the signal level suddenly increases, and the switch threshold is exceeded. The exceeding of the switch threshold is registered by the observation unit 11 and the drilling process for this microhole 25 is ended thereinafter.

The signal level for various microholes 25 is depicted in FIG. 5. Since the microholes 25 introduced into the natural material leather 20 generally deviate from one another, the signal levels measured at each microhole 25 are also usually different.

The recording of the signal level takes place for each microhole 25 to be generated during the laser machining, such that, during a further execution of the movement algorithm, the laser 30 is only still switched on at the sites of the microholes 25 which have not yet been completely pierced. The laser process can also be completely terminated in the event of a specific number of pierced microholes 25.

We claim:

1. Method for introducing a defined line of weakness by removing material from a covering material that has a visible side and a rear side opposite the visible side, in which a pulsed laser beam from a laser is directed at the rear side of the covering material and guided along a track, and at least one observation unit is provided for monitoring the weakening process,
   a) wherein a hollow chamber is provided below the visible side of the covering material, said hollow chamber having a scattering inner surface or reflective inner surface or both and the at least one observation unit is provided on the hollow chamber, wherein a light emerging during the laser irradiation on the visible side of the covering material strikes the inner surface of the hollow chamber and is scattered or reflected or both at least partially onto the at least one observation unit and the light which is incident on the at least one observation unit is used for controlling the laser or
   b) wherein a hollow chamber is provided below the visible side of the covering material, said hollow chamber having a scattering or reflective or both and luminescent inner surface, and the at least one observation unit is provided on the hollow chamber, wherein a light emerging during laser irradiation onto the visible side of the covering material strikes the inner surface of the hollow chamber, is converted at least partially into luminescent light and the luminescent light is scattered or reflected or both at least partially onto the at least one observation unit, and the luminescent light which is incident on the at least one observation unit is used for controlling the laser.

2. Method according to claim 1, wherein the pulsed laser beam from the laser falls on the rear side of the covering material via a mirror and a scanning device.

3. Method according to claim 1, wherein the hollow chamber extends at least below the entire track.

4. Method according to claim 1, wherein the hollow chamber is rectangular.

5. Method according to claim 1, wherein the covering material, the hollow chamber and the laser are fixed during the movement of the laser beam along the track.

6. Method according to claim 1, wherein a slot is provided in a wall of the hollow chamber.

7. Method according to claim 6, wherein the slot corresponds in terms of its course to the course of the line of weakness.

8. Method according to claim 1, wherein the distance c between the microhole of the covering material and the inner surface of the hollow chamber is between 1 cm and 20 cm.

9. Method according to claim 8, wherein distance c between the microhole of the covering material and the inner surface of the hollow chamber is between 5 cm and 10 cm.

10. Method according to claim 1, wherein the inner surface of the hollow chamber is made of paper.

11. Method according to claim 1, wherein the laser is switched off as soon as the at least one observation unit detects when a threshold value of the light measured in the at least one observation unit is exceeded or fallen below.

12. Method according to claim 1, wherein the inner surface of the hollow chamber scatters diffusely at the observation wavelength of the at least one observation unit.

\* \* \* \* \*